(12) United States Patent
Ali-Tolppa et al.

(10) Patent No.: US 12,363,500 B2
(45) Date of Patent: Jul. 15, 2025

(54) POSITIONING ACCURACY INFORMATION

(71) Applicant: NOKIA TECHNOLOGIES OY, Espoo (FI)

(72) Inventors: Janne Tapio Ali-Tolppa, Taufkirchen (DE); Diomidis Michalopoulos, Munich (DE); Jürgen Goerge, Neuried (DE)

(73) Assignee: Nokia Technologies Oy, Espoo (FI)

( * ) Notice: Subject to any disclaimer, the term of this patent is extended or adjusted under 35 U.S.C. 154(b) by 500 days.

(21) Appl. No.: 17/754,461

(22) PCT Filed: Oct. 2, 2019

(86) PCT No.: PCT/EP2019/076719
§ 371 (c)(1),
(2) Date: Apr. 1, 2022

(87) PCT Pub. No.: WO2021/063497
PCT Pub. Date: Apr. 8, 2021

(65) Prior Publication Data
US 2022/0326338 A1    Oct. 13, 2022

(51) Int. Cl.
*G01C 21/34* (2006.01)
*G01S 5/02* (2010.01)
(Continued)

(52) U.S. Cl.
CPC .............. *H04W 4/02* (2013.01); *G01C 21/34* (2013.01); *G01S 5/0244* (2020.05);
(Continued)

(58) Field of Classification Search
CPC . G01C 21/005–3896; G01S 5/0009–30; G01S 19/01–55; G08G 1/005–22; G08G 5/0004–065; G16Y 40/10–60; H04B 17/0082–409; H04W 4/02–90; H04W 24/02–10; H04W 40/005–38;
(Continued)

(56) References Cited

U.S. PATENT DOCUMENTS

2004/0132465 A1* 7/2004 Mattila ................. H04W 4/029
2014/0342662 A1* 11/2014 Das ....................... H04W 4/029

FOREIGN PATENT DOCUMENTS

WO    WO-2017161475 A1 * 9/2017 ............. G01C 21/34

OTHER PUBLICATIONS

International Search Report and Written Opinion for International Application No. PCT/EP2019/076719, mailed on Jun. 23, 2020, 16 pages.
(Continued)

*Primary Examiner* — Timothy J Weidner
(74) *Attorney, Agent, or Firm* — Brake Hughes Bellermann LLP

(57) ABSTRACT

An apparatus comprising: at least one processor; and at least one memory including computer program code; the at least one memory and the computer program code configured to, with the at least one processor, cause the apparatus at least to: receive (600) an indication indicating that positioning accuracy information associated with at least one potential future position of a terminal is to be provided to; and provide (604) the positioning accuracy information associated with the at least one potential future position of the terminal.

6 Claims, 10 Drawing Sheets

---

800 A terminal provides an indication to a cellular network apparatus indicating that positioning accuracy information associated with at least one potential future position of the terminal is to be provided

802 The terminal receives the positioning accuracy information associated with the at least one potential future position of the terminal from the cellular network apparatus

804 The terminal determines a route comprising at least one future position of the terminal based on the positioning accuracy information associated with the at least one potential future position of the terminal

(51) Int. Cl.
  *G08G 1/0968* (2006.01)
  *G16Y 40/60* (2020.01)
  *H04B 17/27* (2015.01)
  *H04W 4/02* (2018.01)
  *H04W 64/00* (2009.01)

(52) U.S. Cl.
  CPC ....... *G08G 1/096805* (2013.01); *H04B 17/27* (2015.01); *H04W 64/006* (2013.01); *G16Y 40/60* (2020.01)

(58) Field of Classification Search
  CPC ... H04W 48/02–20; H04W 64/00–006; H04W 84/005–22; H04W 88/005–188; H04W 92/02–24
  See application file for complete search history.

(56) References Cited

OTHER PUBLICATIONS

3GPP TS 36.355; V15.5.0; 3rd Generation Partnership Project; Technical Specification Group Radio Access Network; Evolved Universal Terrestrial Radio Access (E-UTRA); LTE Positioning Protocol (LPP); (Release 15); Sophia Antipolis, Valbonne, France; Sep. 2019; 224 pages.

3GPP TS 23.271; V15.1.0; 3rd Generation Partnership Project; Technical Specification Group Services and System Aspects; Functional stage 2 description of Location Services (LCS); (Release 15); Sophia Antipolis, Valbonne, France; Sep. 2018; 184 pages.

Office Action for European Application No. 19783270.2, mailed on Jun. 27, 2023, 6 pages.

Office Action for European Application No. 19783270.2, mailed on Apr. 28, 2023, 7 pages.

\* cited by examiner

| Very Low | Low | Low | Very Low | Very Low |
|---|---|---|---|---|
| Low | Med Low | Med Low | Low | Low |
| Very Low | Med Low | Med High | Med Low | Med Low |
| Low | Med High | Very High | Low | Med High |
| Med Low | High | Very High | High | Med Low |
| Med High | Med Low | Very High | Med High | Med Low |
| Low | Med Low | Med High | Med High | Low |
| Very Low | Low | Low | Low | Very Low |

Fig. 4

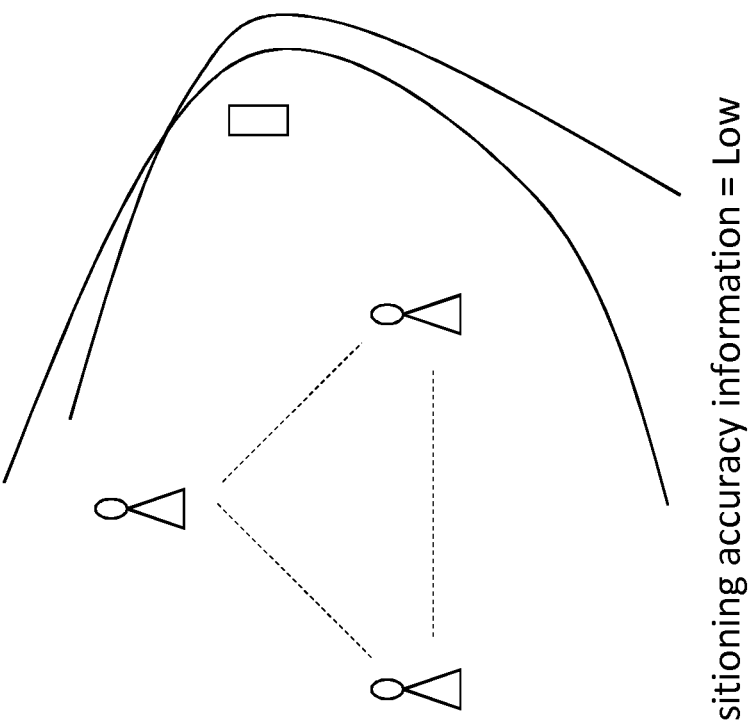
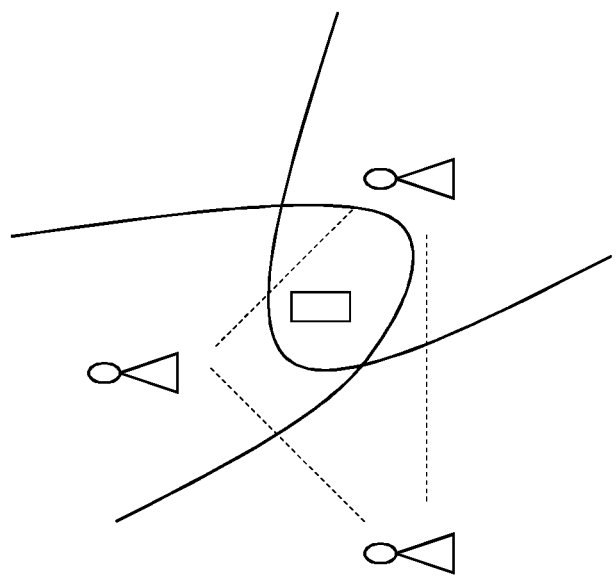
Fig. 5

POSITIONING ACCURACY INFORMATION

CROSS-REFERENCE TO RELATED APPLICATIONS

This application is a national stage entry of International Application No. PCT/EP2019/076719, filed Oct. 2, 2019, entitled "APPARATUS, METHOD, AND COMPUTER PROGRAM" which is hereby incorporated by reference in its entirety.

FIELD OF THE DISCLOSURE

The present disclosure relates to an apparatus, a method, and a computer program for managing positioning accuracy information associated with at least one potential future position of a terminal in a cellular network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: receive an indication indicating that positioning accuracy information associated with at least one potential future position of a terminal is to be provided; and provide the positioning accuracy information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with location assistance data, wherein the location assistance data comprises: positioning accuracy information associated with at least one potential future position of the terminal.

The location assistance data further may comprise: positioning availability information associated with the at least one potential future position of the terminal; and/or positioning method information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with the positioning accuracy information of the at least one potential future position of the terminal.

Receiving an indication indicating that positioning accuracy information associated with at least one potential future position of a terminal is to be provided may comprise: receiving an indication indicating that the terminal has requested the positioning accuracy information associated with the at least one potential future position of the terminal to be provided.

The at least one memory and the computer program code may be configured to, with the at least one processor, cause the apparatus at least to: determine the positioning accuracy information associated with the at least one potential future position of the terminal.

Determining the positioning accuracy information associated with the at least one potential future position of the terminal may comprise: obtaining the at least one potential future position of the terminal; determining that the at least one potential future position of the terminal is within at least one sector of a coverage area, wherein each sector of the coverage area is associated with a respective positioning accuracy; and determining positioning accuracy information respective to the at least sector of the coverage area.

Obtaining the at least one potential future position of the terminal may comprise: receiving the at least one potential future position of the terminal; and/or determining the at least one potential future position of the terminal.

The apparatus may be a core network apparatus or a radio access network apparatus. According to an aspect there is provided an apparatus comprising circuitry configured to: receive an indication indicating that positioning accuracy information associated with at least one potential future position of a terminal is to be provided; and provide the positioning accuracy information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with location assistance data, wherein the location assistance data comprises: positioning accuracy information associated with at least one potential future position of the terminal.

The location assistance data further may comprise: positioning availability information associated with the at least one potential future position of the terminal; and/or positioning method information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with the positioning accuracy information of the at least one potential future position of the terminal.

Receiving an indication indicating that positioning accuracy information associated with at least one potential future position of a terminal is to be provided may comprise: receiving an indication indicating that the terminal has requested the positioning accuracy information associated with the at least one potential future position of the terminal to be provided.

The apparatus may comprise circuitry configured to: determine the positioning accuracy information associated with the at least one potential future position of the terminal.

Determining the positioning accuracy information associated with the at least one potential future position of the terminal may comprise: obtaining the at least one potential future position of the terminal; determining that the at least one potential future position of the terminal is within at least one sector of a coverage area, wherein each sector of the coverage area is associated with a respective positioning accuracy; and determining positioning accuracy information respective to the at least sector of the coverage area.

Obtaining the at least one potential future position of the terminal may comprise: receiving the at least one potential future position of the terminal; and/or determining the at least one potential future position of the terminal.

The apparatus may be a core network apparatus or a radio access network apparatus.

According to an aspect there is provided an apparatus comprising means for: receiving an indication indicating that positioning accuracy information associated with at least one potential future position of a terminal is to be provided; and providing the positioning accuracy information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with location assistance data, wherein the location assistance data comprises: positioning accuracy information associated with at least one potential future position of the terminal.

The location assistance data further may comprise: positioning availability information associated with the at least one potential future position of the terminal; and/or positioning method information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with the positioning accuracy information of the at least one potential future position of the terminal.

Receiving an indication indicating that positioning accuracy information associated with at least one potential future position of a terminal is to be provided may comprise: receiving an indication indicating that the terminal has requested the positioning accuracy information associated with the at least one potential future position of the terminal to be provided.

The apparatus may comprise means for: determining the positioning accuracy information associated with the at least one potential future position of the terminal.

Determining the positioning accuracy information associated with the at least one potential future position of the terminal may comprise: obtaining the at least one potential future position of the terminal; determining that the at least one potential future position of the terminal is within at least one sector of a coverage area, wherein each sector of the coverage area is associated with a respective positioning accuracy; and determining positioning accuracy information respective to the at least sector of the coverage area.

Obtaining the at least one potential future position of the terminal may comprise: receiving the at least one potential future position of the terminal; and/or determining the at least one potential future position of the terminal.

The apparatus may be a core network apparatus or a radio access network apparatus.

According to an aspect there is provided a method comprising: receiving an indication indicating that positioning accuracy information associated with at least one potential future position of a terminal is to be provided; and providing the positioning accuracy information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with location assistance data, wherein the location assistance data comprises: positioning accuracy information associated with at least one potential future position of the terminal.

The location assistance data further may comprise: positioning availability information associated with the at least one potential future position of the terminal; and/or positioning method information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with the positioning accuracy information of the at least one potential future position of the terminal.

Receiving an indication indicating that positioning accuracy information associated with at least one potential future position of a terminal is to be provided may comprise: receiving an indication indicating that the terminal has requested the positioning accuracy information associated with the at least one potential future position of the terminal to be provided.

The method may comprise: determining the positioning accuracy information associated with the at least one potential future position of the terminal.

Determining the positioning accuracy information associated with the at least one potential future position of the terminal may comprise: obtaining the at least one potential future position of the terminal; determining that the at least one potential future position of the terminal is within at least one sector of a coverage area, wherein each sector of the coverage area is associated with a respective positioning accuracy; and determining positioning accuracy information respective to the at least sector of the coverage area.

Obtaining the at least one potential future position of the terminal may comprise: receiving the at least one potential future position of the terminal; and/or determining the at least one potential future position of the terminal.

The method may be performed by a core network apparatus or a radio access network apparatus.

According to an aspect there is provided a computer program comprising computer executable code which when run on at least one processor is configured to: receive an indication indicating that positioning accuracy information associated with at least one potential future position of a terminal is to be provided; and provide the positioning accuracy information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with location assistance data, wherein the location assistance data comprises: positioning accuracy information associated with at least one potential future position of the terminal.

The location assistance data further may comprise: positioning availability information associated with the at least one potential future position of the terminal; and/or positioning method information associated with the at least one potential future position of the terminal.

Receiving an indication indicating that positioning accuracy information associated with at least one potential future position of a terminal is to be provided may comprise: receiving an indication indicating that the terminal has subscribed to a service to be provided with the positioning accuracy information of the at least one potential future position of the terminal.

Receiving an indication indicating that positioning accuracy information associated with at least one potential future position of a terminal is to be provided may comprise: receiving an indication indicating that the terminal has requested the positioning accuracy information associated with the at least one potential future position of the terminal to be provided.

The computer program may comprise computer executable code which when run on at least one processor is configured to to: determine the positioning accuracy information associated with the at least one potential future position of the terminal.

Determining the positioning accuracy information associated with the at least one potential future position of the terminal may comprise: obtaining the at least one potential future position of the terminal; determining that the at least one potential future position of the terminal is within at least one sector of a coverage area, wherein each sector of the coverage area is associated with a respective positioning accuracy; and determining positioning accuracy information respective to the at least sector of the coverage area.

Obtaining the at least one potential future position of the terminal may comprise: receiving the at least one potential future position of the terminal; and/or determining the at least one potential future position of the terminal.

The processor may be part of a core network apparatus or a radio access network apparatus.

According to an aspect there is provided an apparatus comprising at least one processor and at least one memory including computer code for one or more programs, the at least one memory and the computer code configured, with the at least one processor, to cause the apparatus at least to: provide an indication indicating that positioning accuracy information associated with at least one potential future position of a terminal is to be provided.

The at least one memory and the computer program code may be configured to, with the at least one processor, cause the apparatus at least to: provide an indication indicating that positioning accuracy information associated with a potential future position of a terminal is to be provided; receive the positioning accuracy information associated with the at least one potential future position of the terminal; and determine a route comprising at least one future position of the terminal based on the positioning accuracy information associated with the at least one potential future position of the terminal.

Providing an indication indicating that positioning accuracy information associated with at least one potential future position of a terminal is to be provided may comprise: subscribing to a service to be provided with location assistance data, wherein the location assistance data comprises: positioning accuracy information associated with at least one potential future position of the terminal.

The location assistance data may further comprise: positioning availability information associated with the at least one potential future position of the terminal; and/or positioning method information associated with the at least one potential future position of the terminal.

Providing an indication indicating that positioning accuracy information associated with at least one potential future position of a terminal is to be provided may comprise: subscribing to a service to be provided with the positioning accuracy information of the at least one potential future position of the terminal.

Providing an indication indicating that positioning accuracy information associated with at least one potential future position of a terminal is to be provided may comprise: sending a request to be provided with the positioning accuracy information associated with the at least one potential future position of the terminal.

The at least one memory and the computer program code may be configured to, with the at least one processor, cause the apparatus at least to: determine and send the at least one potential future position of the terminal.

The apparatus may be a terminal.

According to an aspect there is provided an apparatus comprising circuitry configured to: provide an indication indicating that positioning accuracy information associated with at least one potential future position of a terminal is to be provided.

The apparatus may comprise circuitry configured to: provide an indication indicating that positioning accuracy information associated with a potential future position of a terminal is to be provided; receive the positioning accuracy information associated with the at least one potential future position of the terminal; and determine a route comprising at least one future position of the terminal based on the positioning accuracy information associated with the at least one potential future position of the terminal.

Providing an indication indicating that positioning accuracy information associated with at least one potential future position of a terminal is to be provided may comprise: subscribing to a service to be provided with location assistance data, wherein the location assistance data comprises: positioning accuracy information associated with at least one potential future position of the terminal.

The location assistance data may further comprise: positioning availability information associated with the at least one potential future position of the terminal; and/or positioning method information associated with the at least one potential future position of the terminal.

Providing an indication indicating that positioning accuracy information associated with at least one potential future position of a terminal is to be provided may comprise: subscribing to a service to be provided with the positioning accuracy information of the at least one potential future position of the terminal.

Providing an indication indicating that positioning accuracy information associated with at least one potential future position of a terminal is to be provided may comprise: sending a request to be provided with the positioning accuracy information associated with the at least one potential future position of the terminal.

The apparatus may comprise circuitry configured to: determine and send the at least one potential future position of the terminal.

The apparatus may be a terminal.

According to an aspect there is provided an apparatus comprising means for: providing an indication indicating that positioning accuracy information associated with at least one potential future position of a terminal is to be provided.

The apparatus may comprise means for: providing an indication indicating that positioning accuracy information associated with a potential future position of a terminal is to be provided; receive the positioning accuracy information associated with the at least one potential future position of the terminal; and determine a route comprising at least one future position of the terminal based on the positioning accuracy information associated with the at least one potential future position of the terminal.

Providing an indication indicating that positioning accuracy information associated with at least one potential future position of a terminal is to be provided may comprise: subscribing to a service to be provided with location assistance data, wherein the location assistance data comprises: positioning accuracy information associated with at least one potential future position of the terminal.

The location assistance data may further comprise: positioning availability information associated with the at least one potential future position of the terminal; and/or positioning method information associated with the at least one potential future position of the terminal.

Providing an indication indicating that positioning accuracy information associated with at least one potential future position of a terminal is to be provided may comprise: subscribing to a service to be provided with the positioning accuracy information of the at least one potential future position of the terminal.

Providing an indication indicating that positioning accuracy information associated with at least one potential future position of a terminal is to be provided may comprise: sending a request to be provided with the positioning accuracy information associated with the at least one potential future position of the terminal.

The apparatus may comprise means for: determining and sending the at least one potential future position of the terminal.

The apparatus may be a terminal.

According to an aspect there is provided a method comprising: providing an indication indicating that positioning accuracy information associated with at least one potential future position of a terminal is to be provided.

The method may comprise: providing an indication indicating that positioning accuracy information associated with a potential future position of a terminal is to be provided; receive the positioning accuracy information associated with the at least one potential future position of the terminal; and determine a route comprising at least one future position of the terminal based on the positioning accuracy information associated with the at least one potential future position of the terminal.

Providing an indication indicating that positioning accuracy information associated with at least one potential future position of a terminal is to be provided may comprise: subscribing to a service to be provided with location assistance data, wherein the location assistance data comprises: positioning accuracy information associated with at least one potential future position of the terminal.

The location assistance data may further comprise: positioning availability information associated with the at least one potential future position of the terminal; and/or positioning method information associated with the at least one potential future position of the terminal.

Providing an indication indicating that positioning accuracy information associated with at least one potential future position of a terminal is to be provided may comprise: subscribing to a service to be provided with the positioning accuracy information of the at least one potential future position of the terminal.

Providing an indication indicating that positioning accuracy information associated with at least one potential future position of a terminal is to be provided may comprise: sending a request to be provided with the positioning accuracy information associated with the at least one potential future position of the terminal.

The method may comprise: determining and send the at least one potential future position of the terminal.

The method may be performed by a terminal.

According to an aspect there is provided a computer program comprising computer executable code which when run on at least one processor is configured to: provide an indication indicating that positioning accuracy information associated with at least one potential future position of a terminal is to be provided.

The computer program may comprise computer executable code which when run on at least one processor is configured to: provide an indication indicating that positioning accuracy information associated with a potential future position of a terminal is to be provided; receive the positioning accuracy information associated with the at least one potential future position of the terminal; and determine a route comprising at least one future position of the terminal based on the positioning accuracy information associated with the at least one potential future position of the terminal.

Providing an indication indicating that positioning accuracy information associated with at least one potential future position of a terminal is to be provided may comprise: subscribing to a service to be provided with location assistance data, wherein the location assistance data comprises: positioning accuracy information associated with at least one potential future position of the terminal.

The location assistance data may further comprise: positioning availability information associated with the at least one potential future position of the terminal; and/or positioning method information associated with the at least one potential future position of the terminal.

Providing an indication indicating that positioning accuracy information associated with at least one potential future position of a terminal is to be provided may comprise: subscribing to a service to be provided with the positioning accuracy information of the at least one potential future position of the terminal.

Providing an indication indicating that positioning accuracy information associated with at least one potential future position of a terminal is to be provided may comprise: sending a request to be provided with the positioning accuracy information associated with the at least one potential future position of the terminal.

The computer program may comprise computer executable code which when run on at least one processor is configured to: determine and send the at least one potential future position of the terminal.

The processor may be part of a terminal.

According to an aspect there is provided an apparatus comprising at least one processor and at least one memory including computer code for one or more programs, the at least one memory and the computer code configured, with the at least one processor, to cause the apparatus at least to: receive a request to achieve a specified positioning accuracy at at least one future position of a terminal; and determine whether the specified positioning accuracy associated with the at least one future position of the terminal can be achieved.

The at least one memory and the computer program code may be configured to, with the at least one processor, cause the apparatus at least to: determine that the specified positioning accuracy associated with the at least one future position of the terminal can be achieved; and set the positioning accuracy information associated with the at least one future position of the terminal to the specified positioning accuracy.

Setting the positioning accuracy information associated with the at least one future position of the terminal to the specified positioning accuracy may comprise: setting the positioning accuracy information associated with the at least one future position of the terminal to the specified positioning accuracy to be above a threshold.

Setting the positioning accuracy information associated with the at least one future position of the terminal to the specified positioning accuracy be above a threshold may comprise: setting the positioning accuracy information associated with the at least one future position of the terminal to the specified positioning accuracy to be above a threshold during a current and/or future time interval.

The at least one memory and the computer program code may be configured to, with the at least one processor, cause the apparatus at least to: determine that the specified positioning accuracy at the at least one future position of the terminal cannot be achieved; and send an indication to the terminal indicating that the positioning accuracy information associated with the at least one future position of the terminal cannot be set to the specified positioning accuracy and/or send indication to the terminal indicating available positioning accuracy information associated with the at least one future position of the terminal.

The apparatus may be a core network apparatus or a radio access network apparatus.

According to an aspect there is provided an apparatus comprising circuitry configured to: receive a request to achieve a specified positioning accuracy at at least one future position of a terminal; and determine whether the specified positioning accuracy associated with the at least one future position of the terminal can be achieved.

The apparatus may comprise circuitry configured to: determine that the specified positioning accuracy associated with the at least one future position of the terminal can be achieved; and set the positioning accuracy information associated with the at least one future position of the terminal to the specified positioning accuracy.

Setting the positioning accuracy information associated with the at least one future position of the terminal to the specified positioning accuracy may comprise: setting the positioning accuracy information associated with the at least one future position of the terminal to the specified positioning accuracy to be above a threshold.

Setting the positioning accuracy information associated with the at least one future position of the terminal to the specified positioning accuracy be above a threshold may comprise: setting the positioning accuracy information associated with the at least one future position of the terminal to the specified positioning accuracy to be above a threshold during a current and/or future time interval.

The apparatus may comprise circuitry configured to: determine that the specified positioning accuracy at the at least one future position of the terminal cannot be achieved; and send an indication to the terminal indicating that the positioning accuracy information associated with the at least one future position of the terminal cannot be set to the specified positioning accuracy and/or send indication to the terminal indicating available positioning accuracy information associated with the at least one future position of the terminal.

The apparatus may be a core network apparatus or a radio access network apparatus.

According to an aspect there is provided an apparatus comprising means for: receiving a request to achieve a specified positioning accuracy at at least one future position of a terminal; and determining whether the specified positioning accuracy associated with the at least one future position of the terminal can be achieved.

The apparatus may comprise means for: determining that the specified positioning accuracy associated with the at least one future position of the terminal can be achieved; and set the positioning accuracy information associated with the at least one future position of the terminal to the specified positioning accuracy.

Setting the positioning accuracy information associated with the at least one future position of the terminal to the specified positioning accuracy may comprise: setting the positioning accuracy information associated with the at least one future position of the terminal to the specified positioning accuracy to be above a threshold.

Setting the positioning accuracy information associated with the at least one future position of the terminal to the specified positioning accuracy be above a threshold may comprise: setting the positioning accuracy information associated with the at least one future position of the terminal to the specified positioning accuracy to be above a threshold during a current and/or future time interval.

The apparatus may comprise means for: determining that the specified positioning accuracy at the at least one future position of the terminal cannot be achieved; and sending an indication to the terminal indicating that the positioning accuracy information associated with the at least one future position of the terminal cannot be set to the specified positioning accuracy and/or sending indication to the terminal indicating available positioning accuracy information associated with the at least one future position of the terminal.

The apparatus may be a core network apparatus or a radio access network apparatus.

According to an aspect there is provided a method comprising: receiving a request to achieve a specified positioning accuracy at at least one future position of a terminal; and determining whether the specified positioning accuracy associated with the at least one future position of the terminal can be achieved.

The method may comprise: determining that the specified positioning accuracy associated with the at least one future position of the terminal can be achieved; and setting the positioning accuracy information associated with the at least one future position of the terminal to the specified positioning accuracy.

Setting the positioning accuracy information associated with the at least one future position of the terminal to the specified positioning accuracy may comprise: setting the positioning accuracy information associated with the at least one future position of the terminal to the specified positioning accuracy to be above a threshold.

Setting the positioning accuracy information associated with the at least one future position of the terminal to the specified positioning accuracy be above a threshold may comprise: setting the positioning accuracy information associated with the at least one future position of the terminal to the specified positioning accuracy to be above a threshold during a current and/or future time interval.

The method may comprise: determining that the specified positioning accuracy at the at least one future position of the terminal cannot be achieved; and sending an indication to the terminal indicating that the positioning accuracy information associated with the at least one future position of the terminal cannot be set to the specified positioning accuracy and/or sending indication to the terminal indicating available positioning accuracy information associated with the at least one future position of the terminal.

The method may be performed by a core network apparatus or a radio access network apparatus.

According to an aspect there is provided a computer program comprising computer executable code which when run on at least one processor is configured to: receive a request to achieve a specified positioning accuracy at at least one future position of a terminal; and determine whether the specified positioning accuracy associated with the at least one future position of the terminal can be achieved.

The computer program may comprise computer executable code which when run on at least one processor is configured to: determine that the specified positioning accuracy associated with the at least one future position of the terminal can be achieved; and set the positioning accuracy information associated with the at least one future position of the terminal to the specified positioning accuracy.

Setting the positioning accuracy information associated with the at least one future position of the terminal to the specified positioning accuracy may comprise: setting the positioning accuracy information associated with the at least one future position of the terminal to the specified positioning accuracy to be above a threshold.

Setting the positioning accuracy information associated with the at least one future position of the terminal to the specified positioning accuracy be above a threshold may comprise: setting the positioning accuracy information associated with the at least one future position of the terminal to the specified positioning accuracy to be above a threshold during a current and/or future time interval.

The computer program may comprise computer executable code which when run on at least one processor is configured to: determine that the specified positioning accuracy at the at least one future position of the terminal cannot be achieved; and send an indication to the terminal indicating that the positioning accuracy information associated with the at least one future position of the terminal cannot be set to the specified positioning accuracy and/or send indication to the terminal indicating available positioning accuracy information associated with the at least one future position of the terminal.

The processor may be part of a core network apparatus or a radio access network apparatus.

According to an aspect there is provided an apparatus comprising at least one processor and at least one memory including computer code for one or more programs, the at least one memory and the computer code configured, with the at least one processor, to cause the apparatus at least to: send a request to achieve a specified positioning accuracy at at least one future position of the terminal.

The at least one memory and the computer program code are configured to, with the at least one processor, cause the apparatus at least to: determine a route comprising the at least one future position of the terminal.

The apparatus may be a terminal.

According to an aspect there is provided an apparatus comprising circuitry configured to: send a request to achieve a specified positioning accuracy at at least one future position of the terminal.

The apparatus may comprise circuitry configured to: determine a route comprising the at least one future position of the terminal.

The apparatus may be a terminal.

According to an aspect there is provided an apparatus comprising means for: sending a request to achieve a specified positioning accuracy at at least one future position of the terminal.

The apparatus may comprise means for: determining a route comprising the at least one future position of the terminal.

The apparatus may be a terminal.

According to an aspect there is provided a method comprising: sending a request to achieve a specified positioning accuracy at at least one future position of the terminal.

The method may comprise: determining a route comprising the at least one future position of the terminal.

The method may be performed by a terminal.

According to an aspect there is provided a computer program comprising computer executable code which when run on at least one processor is configured to: send a request to achieve a specified positioning accuracy at at least one future position of the terminal.

The computer program may comprise computer executable code which when run on at least one processor is configured to: determine a route comprising the at least one future position of the terminal.

The processor may be part of a terminal.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AGF: Automatic Guided Vehicle
AUSF: Authentication Server Function
AMF: Access Management Function
CU: Centralized Unit
DN: Data Network
DU: Distributed Unit
GNB: gNodeB
GNSS: Global Navigation Satellite System
GPS: Global Positioning System
GSM: Global System for Mobile communication
HSS: Home Subscriber Server
ID: Identifier
IoT: Internet of Things
LTE: Long Term Evolution
LMC: Location Management Component
LMF: Location Management Function
LPP: Long Term Evolution Positioning Protocol
NEF: Network Exposure Function
NR: New Radio
MS: Mobile Station
MTC: Machine Type Communication
OTDOA: Observed Time Difference Of Arrival
RAM: Random Access Memory
RAN: Radio Access Network
ROM: Read Only Memory
RTK: Real-Time Kinetic
SMF: Session Management Function
UDM: User Data Management
UE: User Equipment
UMTS: Universal Mobile Telecommunication System
USB: Universal Serial Bus
3GPP: 3$^{rd}$ Generation Partnership Project
5G: 5th Generation
5GC: 5G Core network
5GRAN: 5G Radio Access Network
5GS: 5G System

BRIEF DESCRIPTION OF THE FIGURES

Embodiments will now be described, by way of example only, with reference to the accompanying Figures in which:

FIG. 4 shows a schematic representation of a portion of a coverage area of a cellular network split into sectors, each sector being associated with respective positioning accuracy information;

FIG. 5 shows a schematic representation of a cellular network and illustrating that when the position of a terminal is determined using triangulation the accuracy of the position of a terminal depends on the location of the terminal in relation to base stations;

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
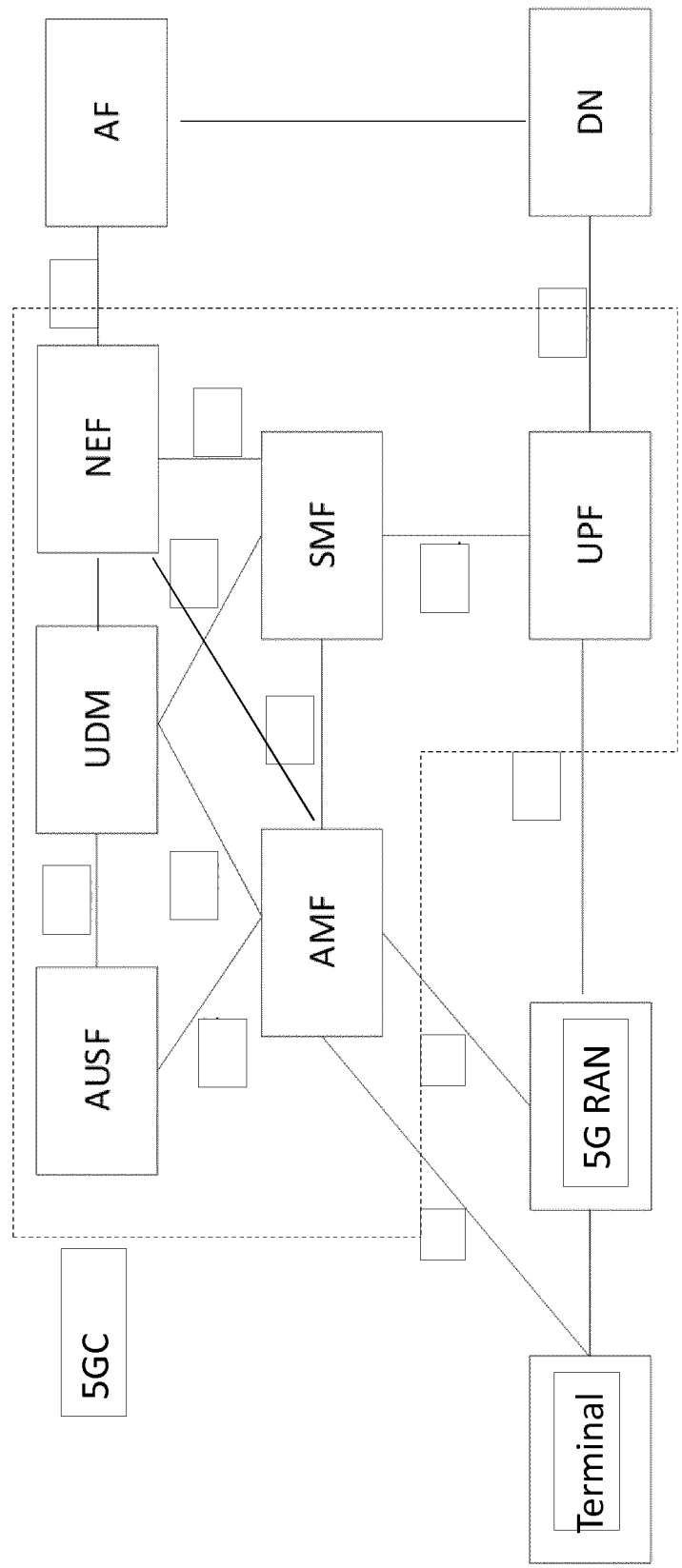
FIG. 1 shows a schematic representation of a 5G system (5GS)

FIG. 1 shows a schematic representation of a 5G system (5GS). The 5GS may comprises a terminal, a 5G radio access network (5GRAN), a 5G core network (5GC), one or more application function (AF) and one or more data networks (DN).

The 5GRAN may comprise one or more gNodeB (GNB) distributed unit functions connected to one or more gNodeB (GNB) centralized unit functions.

The 5GC may comprise an access management function (AMF), a session management function (SMF), an authentication server function (AUSF), a user data management (UDM), a user plane function (UPF) and/or a network exposure function (NEF).

Figure 2:
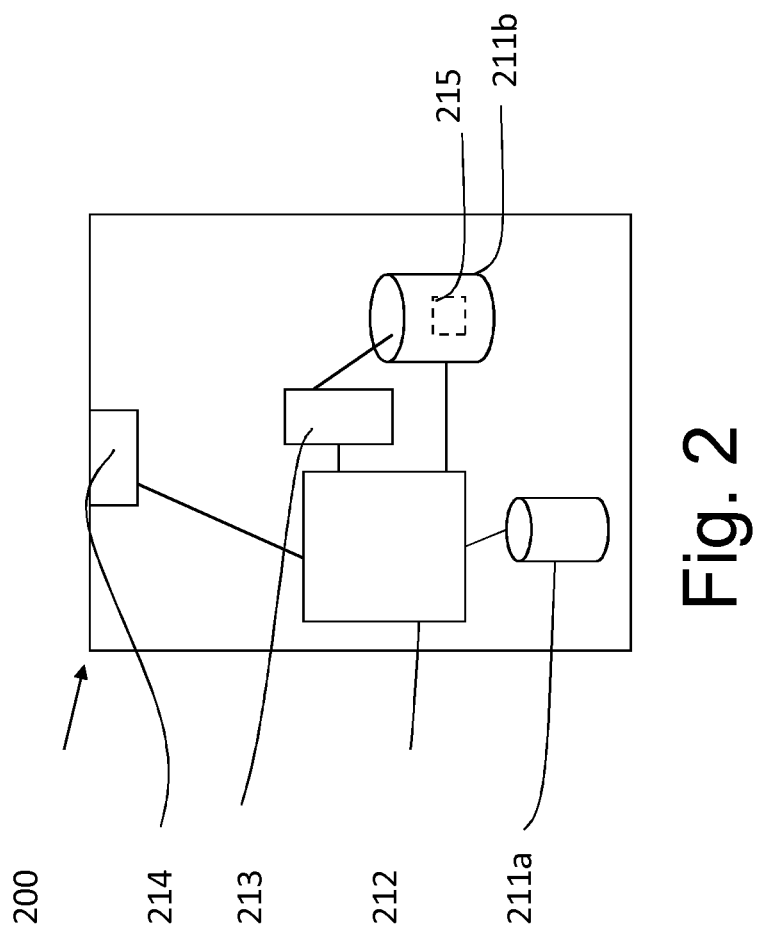
FIG. 2 shows a schematic representation of a control apparatus.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
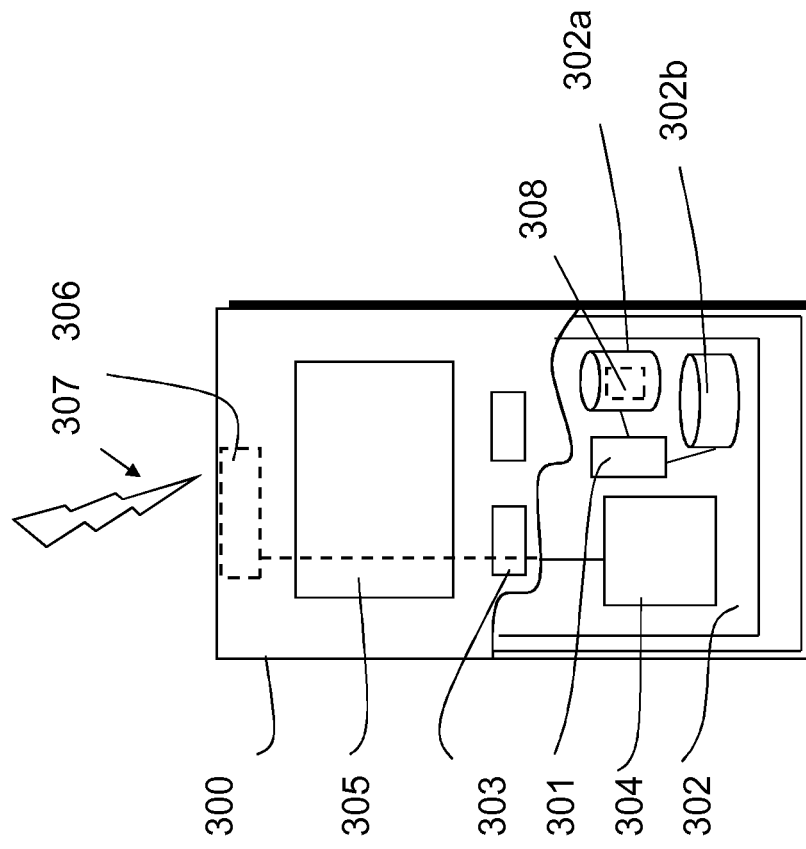
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 302b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

One or more of the following aspects relate to 5GS. However, it will be understood that similar aspects may relate to other systems.

Several methods have been proposed for determining the position of a terminal in indoor and/or outdoor environments. Some of these methods use a cellular network (e.g. triangulation). The position of the terminal may be determined by the terminal with the assistance of the cellular network. Alternatively, the position of the terminal may be determined by the cellular network and provided to the terminal.

The position of the terminal may be used for an increasing number of use cases comprising uncritical leisure activities like geo-caching, business cases like location-based marketing or safety-critical guidance of autonomously guided vehicles (AGVs), such as an autonomously driving car.

AGVs may rely on the position of the AGV to plan for an optimal route and/or an optimal velocity. Knowing in advance where in a coverage area the position of an AGV may be determined accurately and where in the coverage area the position of the AGV may be determined inaccurately may be critical for use cases like route selection, control method selection, operational constraint selection (e.g. maximum speed) or other use cases. The accuracy of the position of the AGV may vary when the AGV transitions between different environments, for example when transitioning from an outdoor environment to an indoor environment or when transitioning within an environment, for example within an indoor environment between rooms.

Future cellular networks may be able to provide a form of seamless positioning. That is, future cellular networks may be able to provide availability positioning information, accuracy positioning information and/or positioning method information associated with potential future positions occupied by the AGVs (e.g. the AGVs do not yet occupy the potential future positions but may plan to occupy these potential future positions or at least contemplate to occupy these potential future positions for example when planning for a route toward a destination).

In this disclosure, the expression "positioning availability information" associated with a potential future position occupied by the AGV designates information specifying whether the position of the AGV may be determined when the AGV occupies the potential future position. The "availability information" may take different values or positioning availabilities comprising "Availability", "No Availability" or other.

In this disclosure, the expression "positioning accuracy information" associated with a potential future position occupied by the AGV refers to information specifying how accurately the position of the AGV may be determined when the AGV occupies the potential future position. The "positioning accuracy information" may take different values or positioning accuracies comprising "Very low accuracy", "Low accuracy", "Medium Low accuracy", "Medium High accuracy", "High accuracy" and "Very high accuracy" or other.

In this disclosure, the expression "positioning method information" associated with a potential future position occupied by the AGV refers to information specifying by which method the position of the AGV may be determined when the AGV occupies the potential future position. The accuracy information" may take different values or positioning methods comprising "Triangulation", "Global Navigation Satellite System (GNSS)", "GNSS assisted with Real-Time Kinetic (RTK)" or other.

Accuracy information associated with a potential future position occupied by an AGV may enable critical applications to anticipate whether the position of the AGV will be determined accurately throughout the mobility of the AGV. This may enable ubiquitous telco-grade positioning service in future networks, where the AGVs may expect an accurate determination of the position of the AGV wherever it goes (similar to ubiquitous data connectivity) or at least to be able to know in advance how accurate the determination of the position of the AGV will be.

In an example, an AGV may move between environments associated with distinct positioning accuracy information. Assume an AGV may be on a road and may need to enter a building (e.g. a factory). Outside the building the routing algorithms may be supplied with a position of the AGV determined via GNSS with very high accuracy (particularly when assisted with RTK). Inside the building, due to the absence of satellite coverage, the position of the AGV may need to be determined by indoor positioning methods, for example the position of the AGV may be determined via a cellular network, a WiFi network or another wireless communication network. In case the AGV has no prior knowledge regarding what level of positioning accuracy to expect in the part of the building it is entering, it may have to prepare for the worst with respect to the accuracy of the position of the AGV that may be determined within the building. In particular, the AGV may even have to assume no external service at all and may have to rely only on internal methods (e.g. inertial) and sensors.

In another example, an appropriate velocity of an AGV may typically depend on availability positioning information and/or accuracy positioning information associated with potential future positions occupied by the AGV. The overall time of travel from starting point to target location may depend on the route, in the sense that different routes offer different potential future positions occupied by the AGV and therefore different availability positioning information and/or accuracy positioning information associated with the potential future positions occupied by the AGV. Consequently, if during the initial planning of the route the algorithms was aware of the expected availability positioning information and/or accuracy positioning information associated with the potential future positions occupied by the AGV, then the routing algorithms may be able to consider the resulting differences in terms of velocity and might base the routing decision on the expected availability positioning information and/or accuracy positioning information associated with the potential future positions occupied by the AGV.

So far, no solutions has contemplated using accuracy positioning information of a potential future position occupied by an AGV for planning the route of an AGV. Although planning the route of an AGV may in principle not be based exclusively on the accuracy positioning information associated with a potential future position occupied by an AGV, providing such accuracy positioning information may increase the effective use of AGVs, as well as enhance other lateral aspects such as safety.

Existing solutions contemplate using positioning accuracy information associated with a current position of a positioning target (e.g. terminal). The cellular network may determine the current position of the terminal, may determine positioning accuracy information associated with the current position of the terminal and may provide to the terminal the current position of the terminal and the positioning accuracy information associated with the current position of the terminal (see 3GPP TS 23.271, Technical Specification Group Services and System Aspects; Functional stage 2 description of Location Services (LCS), (Release 15), section 5.5.1).

One or more of the following aspect provide a solution where the positioning accuracy information associated with a potential future position of the terminal (i.e. positions not yet occupied by the terminal but likely to be occupied) may be provided to the terminal. The positioning accuracy information associated with the at least one potential future position of the terminal may be provided in complement to positioning accuracy information associated with a position of the terminal or in replacement of positioning accuracy information associated with a position of the terminal.

One or more of the following aspects allow a terminal to send a request to a cellular network to be provided with positioning accuracy information associated with a potential future position occupied by the terminal (i.e. positions not yet occupied by the terminal but likely to be occupied by the terminal or positions that the terminal plans to occupy/visit). Along with positioning assistance data that a terminal may obtain, typically via the LTE Positioning protocol (LPP), positioning accuracy information may also be exchanged between the cellular network and the terminal.

A coverage area may be split into sectors (or "pixels"). The sectors may take any form and may be squares, rectangles, circles or other. Each sector may be associated with respective positioning accuracy information estimated for this sector. Such positioning accuracy information may be updated either with positioning accuracy information collected via standardized interfaces to the location management function (LMF) or with positioning accuracy information provided via external location services.

One or more of the following aspects also allow a terminal to send a request to a cellular network to achieve a specified positioning accuracy at a future position occupied by the terminal. For example, the terminal may send a request to the cellular network to update the positioning accuracy associated with the future position occupied by the terminal so as to guarantee that the positioning accuracy information associated with the future position occupied by the terminal takes a value above a threshold.

Likewise, a terminal may send a request to a cellular network to achieve a specified positioning accuracy at a current position occupied by the terminal. For example, the terminal may send a request to the cellular network to update the positioning accuracy associated with the current position occupied by the terminal so as to guarantee that the positioning accuracy information associated with the current position occupied by the terminal takes a value above a threshold.

From another viewpoint, this concept relates to the instantiation of a positioning slice, with given performance characteristics in terms of positioning, for given terminal, at given (current and future) location, and potentially at given time.

Positioning accuracy information may be distributed to a terminal in different ways.

In a first implementation, the terminal may subscribe to a service which periodically provides notifications on location assistance data associated with a current position occupied by the terminal and/or associated with potential future positions occupied by the terminal.

The terminal may define one or more filters (e.g. geographical filter and/or time filter) to specify the scope (e.g. perimeter, periodicity and/or duration) in which the terminal is interested in receiving such location assistance data notifications.

The location assistance data may comprise positioning availability information, positioning accuracy information and/or positioning method information associated with the current position occupied by the terminal and/or associated with the potential future position occupied by the terminal.

The positioning accuracy information associated with the current position occupied by the terminal and/or associated with the potential future position occupied by the terminal may be broadcasted to all terminals in a coverage area that are configured to receive the location assistance data (e.g. 3GPP TS 36.355).

This may imply that a terminal may receive the positioning accuracy information although the terminal may not use such positioning accuracy information (i.e. the terminal may have requested a periodic reception of location assistance data but may not necessarily use the accuracy information associated with a current position occupied by the terminal and/or associated with the potential future position occupied by the terminal).

FIG. 4 illustrates a schematic representation of a portion of coverage area of a cellular network split into forty sectors, each sector associated with respective positioning accuracy information. A terminal located within a current sector may receive positioning accuracy information associated with the current sector occupied by the terminal and/or associated with a potential future sector occupied by the terminal (e.g. neighbouring sector or nearby sector in relation to the current sector).

In a second implementation, the terminal may subscribe to a service which periodically provides notifications on positioning accuracy information associated with the current position occupied by the terminal and/or associated with a potential future position occupied by the terminal (but not necessarily on positioning availability information and/or positioning method associated with the current position occupied by the terminal and/or associated with the potential future position occupied by the terminal).

The terminal may define one or more filters (e.g. geographical filter and/or time filter) to specify the scope (e.g. perimeter, periodicity and/or duration) in which the terminal is interested in receiving such positioning accuracy information notifications.

In a third implementation, the positioning accuracy information associated with the current position occupied by the terminal and/or associated with a potential future position occupied by the terminal may be provided to the terminal upon request.

The terminal may send a request to the network to be provided with the positioning accuracy information associated with the current position occupied by the terminal and/or associated with a potential future position occupied by the terminal with a filter (e.g. geographical filter) to specify the scope (e.g. perimeter) in which the terminal is interested in receiving the positioning accuracy information.

The cellular network may know that certain positioning methods and/or certain positioning accuracies might not be available for certain times and sectors. For example, this may be the case where some cell functionalities are turned off within sectors during night time for saving power. In such case, the positioning accuracy information of the sectors comprises these cell functionalities may vary over time. This information may be part of the positioning accuracy information distributed to a terminal.

A terminal may send a request to achieve a specified positioning accuracy in a sector it intends to visit. For example, the terminal may cause the positioning accuracy information of sectors along a planned route to be set to be greater than a threshold. The terminal may activate a particular positioning method in a particular sector to increase the positioning accuracy information (e.g. in a similar manner that the terminal would activate carrier aggregation in a sector to increase throughput) or may send a request to the network so that the network activates a particular positioning method in a particular sector to increase the positioning accuracy.

The terminal may communicate a planned route to the cellular network, including the time of arrival at particular sectors, so that the cellular network may optimize the availability of any high-cost positioning methods at the time of arrival at particular sectors and in the particular sectors only.

As an example, if an AGV is doing deliveries requiring very high positioning accuracy information in a building located within a sector at specific times and/or on specific days, the required positioning methods may be activated only during those specific times and/or those specific days and only within the sector where it is needed.

The transmission of the position accuracy information to a terminal may be provided by modifying the LPP protocol detailed in 3GPP TS 36.355. This may involve modifications to the existing LPP specifications as well as interfaces used for the exchange of related information. These aspects may be summarized as follows.

In the first and second implementations described above (periodic transmission of positioning accuracy information to the terminal) the positioning accuracy information may be sent to a terminal with certain notifications. With reference to TS 36.355, Figure 5.2.1a-1, the message 1 "RequestAssistanceData" may be modified so as to include the periodic transmission of the positioning accuracy information. The positioning accuracy information may be provided to the UE in signals 3, 4, 7 of TS 36.355, Figure 5.2.1a-1.

In the third implementation (transmission of positioning accuracy information to the terminal upon request), the signals 1, 2 of TS 36.355, Figure 5.2.1-1 may be modified to transmit the positioning accuracy information to the terminal upon request. The "ReqUEstAssistanceData" and "ProvideAssistanceData" messages may be modified accordingly.

A location server providing the positioning accuracy information (i.e. either a LMF in the core network or a location management component (LMC) in RAN) may use several standardized interfaces to collect the positioning accuracy information from different sources:

From base stations (enhancement of S1 interface and equivalent in 5G may be required).

From the location server itself (this may be an internal interface not subject to standardization).

From neighbouring location servers (for example placed at the RAN but in different physical nodes: Xn or new inter-LMC-interface).

From other sources (the location server may have an interface to radio planning tools in order to collect data for example for the positioning algorithm "enhanced Cell Id/Timing Advance" (eCITA). This data expresses the signal strength of the cells of the mobile radio network that can be expected at a certain geographical location of the size of few meters (aka: "pixels")).

Since the cellular network may send several data specific to location-based services through the cellular network (e.g. LPPa, correction data for assisted GPS, etc.), it might be useful in 5G to bundle all corresponding data transmissions into a new standardized slice. Such slice may be dedicated for data related to location services and embrace some or all cellular network functions that are involved in handling these data, including business-related aspects like access control and billing.

Prior to distributing the positioning accuracy information to the terminal, the cellular network may have to collect and maintain the positioning accuracy information.

In a training phase, the cellular network may acquire positioning accuracy information per sector within a coverage area. That is, in this phase the cellular network may collect positioning accuracy information and may associate the positioning accuracy information with respective sectors. This phase may be implemented in an iterative fashion, in the sense that an initial accuracy value per sector may be collected by the deployment planning and continuously updated during cellular network operation.

Most of cellular network-based positioning methods may incur a positioning accuracy that is based on the relative location of the transmission points (e.g. the base stations) and the terminal. For example, in the Observed Time Difference of Arrival (OTDOA) method which is based on triangulation, the location areas that incur high accuracy are those "surrounded" by the base stations, whereas the areas along a straight line of the base stations yield lower positioning accuracy. This phaenomenon is known as the dilution of positioning accuracy (e.g. White paper "Observed Time Difference of Arrival (OTDOA) in 3GPP LTE", Qualcomm, June 2014 and R. B. Langley, Dilution of Precision. GPS World, May 1999). An illustrative view of the positioning accuracy with respect to the location of transmission point is provided in FIG. 5. Hence, during the cellular network deployment planning phase, where the locations of the base stations (or more accurately, the locations of the transmission points used for positioning) are known, the initial values of the accuracy information may be set.

It will be understood that the positioning accuracy information is not restricted to cellular network-based positioning methods and not restricted to sectors that are covered by the cellular network. The cellular network might also report the positioning accuracy information of other methods, not cellular network-based, or for areas that are not covered by the cellular network in case the corresponding positioning accuracy information has been collected by alternative methods.

During cellular network operation, the initial positioning accuracy information may be updated using a positioning training method.

The training method may involve the comparison of at least two positioning methods. Specifically, the position of pilot terminals may be estimated using at least two methods, either cellular network-based (e.g., OTDOA, enhanced Cell ID-ECID) or terminal-based (e.g., using GNSS). Then, positioning accuracy information may be assigned per sector, based on the difference between coordinates obtained via the use of such at least two positioning methods. That is, the smaller the difference on coordinates the higher the positioning accuracy information.

Additionally or alternatively, the training method may involve the comparison of the coordinates of known objects, either physical or virtual objects, and the coordinates of such objects obtained via cellular network-based methods. Then, the positioning accuracy information may be assigned per sector, based on the difference between the known coordinates and those obtained via the cellular network-based method.

For example, an AGV type rover may be used to calibrate an indoor positioning system using odometry.

An example of virtual object refers to the case where the location of a terminal is projected in a "mirror world" representation, where terminals interact with the network based on their position. The popular "Pockemon Go Map game" is a typical example.

Positioning functions may update the positioning accuracy information per sector in case of failure. Given the acquisition of the updated positioning accuracy information per sector, the obtained positioning accuracy information may have the form shown in FIG. 4 or another form.

The positioning accuracy information associated with sectors may be collected and maintained in a central LMF, placed in the core network. This may be compatible with the legacy LTE positioning setup but may yield a large overhead in maintaining and updating such positioning accuracy information for large regions.

The positioning accuracy information associated with potential future positions of a terminal may be collected and maintained in a local LMF placed in the RAN, referred to also as location management component (LMC) in 3GPP studies. This may be in line with existing discussions in 3GPP RAN2 and RAN3 that involve the use of partial location management functionalities in the RAN (e.g. RAN2 104-35 outcome discussion). In this case, the resulting positioning accuracy service to the terminals may be deployed in a distributed manner and the LMCs may share their positioning accuracy information to each other over an Xn interface or a new inter-LMC-interface.

Figure 6:
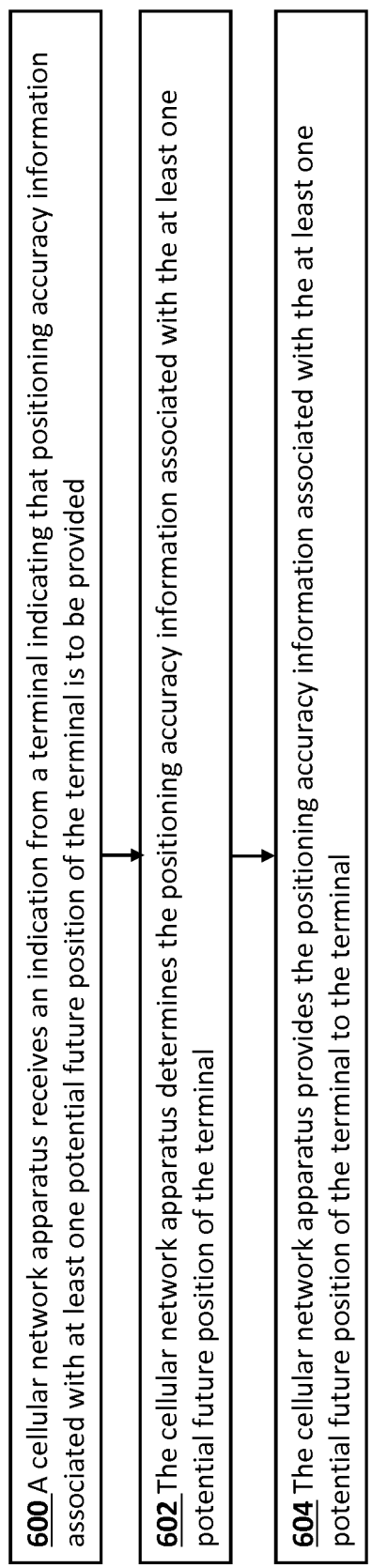
FIG. 6 shows a schematic representative of a method of providing positioning accuracy information associated with at least one potential future position of a terminal performed by a cellular network apparatus such as a core network apparatus or a radio access network apparatus.

FIG. 6 shows a schematic representative of a method of providing positioning accuracy information associated with at least one potential future position of a terminal performed by a cellular network apparatus such as a core network apparatus (e.g. LMF) or a radio access network apparatus (e.g. LMC).

In step 600 the cellular network apparatus may receive an indication indicating that positioning accuracy information associated with at least one potential future position of a terminal is to be provided. The indication may be received from the terminal.

In an implementation, the cellular network may receive an indication indicating that the terminal has subscribed to a service to be periodically provided with location assistance data. The location assistance data may comprises positioning accuracy information associated with at least one potential future position of the terminal, positioning availability information associated with the at least one potential future position of the terminal; and/or positioning method information associated with the at least one potential future position of the terminal.

In another implementation, the cellular network may receive an indication indicating that the terminal has subscribed to a service to be periodically provided with the positioning accuracy information of the at least one potential future position of the terminal (but not necessarily with positioning availability information associated with the at least one potential future position of the terminal and/or positioning method information associated with the at least one potential future position of the terminal unlike the previous implementation).

In yet another implementation, the cellular network may receive an indication indicating that the terminal has requested the positioning accuracy information associated with the at least one potential future position of the terminal to be provided to the terminal.

In step 602 the cellular network apparatus may determine the positioning accuracy information associated with the at least one potential future position of the terminal.

More specifically, the cellular network apparatus may first obtain the at least one potential future position of the terminal. The cellular network apparatus may then determine that the at least one potential future position of the terminal is within at least one sector of a coverage area, wherein each sector of the coverage area is associated with a respective positioning accuracy. The cellular network apparatus may determine the at least one positioning accuracy respective to the at least sector of the coverage area.

The cellular network apparatus may obtain the at least one potential future position of the terminal in various manners.

In an implementation, the terminal may determine a route to a target destination comprising the at least one potential future position of the terminal. The cellular network apparatus may receive the at least one potential future position of the terminal determined by the terminal.

In another implementation, the terminal may determine a route to a target destination comprising the at least one potential future position of the terminal. The cellular network apparatus may determine the at least one potential future position of the terminal.

In step 604 the cellular network apparatus may provide the positioning accuracy information associated with the at least one potential future position of the terminal. The positioning accuracy information may be provided to the terminal.

Figure 7:
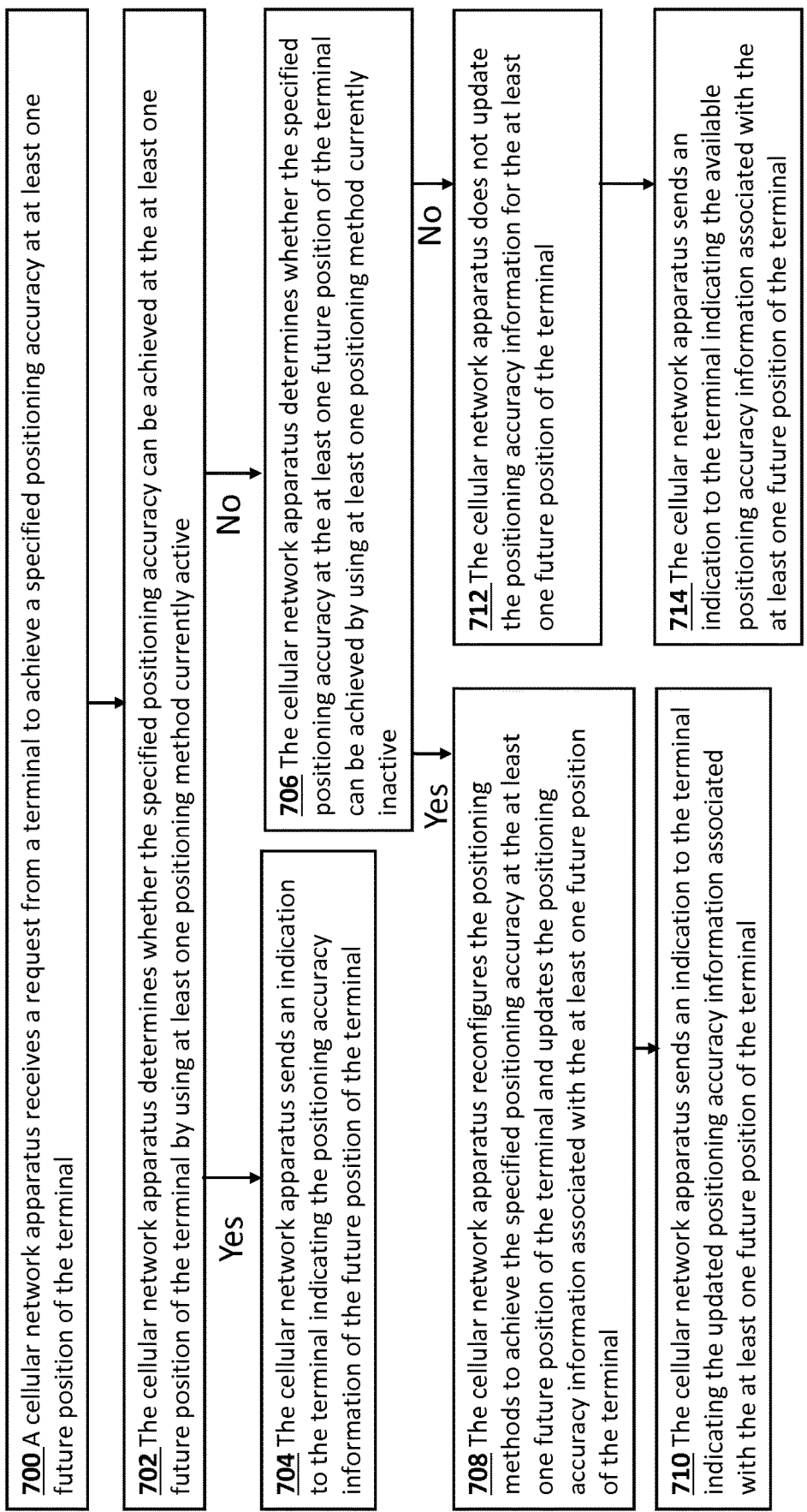
FIG. 7 shows a schematic representative of a method of receiving a request for achieving a specified positioning accuracy at at least one future position of a terminal performed by a cellular network apparatus such as a core network apparatus or a radio access network apparatus.

FIG. 7 shows a schematic representative of a method of receiving a request for achieving a specified positioning accuracy at a future position of a terminal performed by a cellular network apparatus such as a core network apparatus or a radio access network apparatus.

In step 700 the cellular network apparatus may receive a request to achieve a specified positioning accuracy at at least one future position of a terminal. The request may be received from the terminal. The specified positioning accuracy may be specified by the terminal.

For example, the cellular network apparatus may receive a request to set the positioning accuracy information associated with at least one future position of a terminal to the specified positioning accuracy above a threshold during a current and/or future time interval.

In step 702 the cellular network apparatus may determine whether the specified positioning accuracy at at least one future position of the terminal can be achieved, for example by using at least one positioning method currently active.

More specifically, the cellular network apparatus may first obtain the at least one future position of the terminal and the specified position accuracy. The cellular network apparatus may determine that the at least one future position of the terminal is within at least one sector of a coverage area, wherein each sector of the coverage area is associated with respective positioning accuracy information. The cellular network apparatus may determine the at least one positioning accuracy information respective to the at least sector of the coverage area. If the positioning accuracy information respective to the at least sector of the coverage area does not meet the specified positioning accuracy, the cellular network apparatus may determine whether the positioning accuracy information associated with the at least sector of the coverage area can meet the specified positioning accuracy by using at least one positioning method currently active.

The cellular network apparatus may obtain the at least one future position of the terminal in various manners.

In an implementation, the terminal may determine a route to a target destination comprising the at least one future position of the terminal. The cellular network apparatus may receive the at least one future position of the terminal determined by the terminal.

In another implementation, the terminal may determine a route to a target destination comprising the at least one future position of the terminal. The cellular network apparatus may determine the at least one future position of the terminal.

In step 704 (i.e. the cellular network apparatus determines that the specified positioning accuracy at the at least one future position of the terminal can be achieved by using at least one positioning method currently active) the cellular network apparatus may send an indication to the terminal indicating the positioning accuracy information of the future position of the terminal.

In step 706 (i.e. the cellular network apparatus determines that the specified positioning accuracy at the at least one future position of the terminal cannot be achieved by using at least one positioning method currently active) the cellular network apparatus may determine whether the specified positioning accuracy at the at least one future position of the terminal can be achieved by using at least one positioning method currently inactive.

In step 708 (i.e. the cellular network apparatus determines that the specified positioning accuracy at the at least one future position of the terminal can be achieved by using at least one positioning method currently inactive) the cellular network apparatus may reconfigure (e.g., by changing the applied positioning method; by increasing the bandwidth used for positioning; by increasing the periodicity of positioning reference signals, etc.) the currently active and/or currently inactive positioning methods to achieve the specified positioning accuracy. The cellular network apparatus may update the positioning accuracy information associated with the at least one future position of the terminal.

In step 710 the cellular network apparatus may send an indication to the terminal indicating the updated positioning accuracy information at the at least one future position of the terminal.

In step 712 (i.e. the cellular network apparatus determines that the specified positioning accuracy at the at least one future position of the terminal cannot be achieved by using at least one positioning method currently inactive) the cellular network apparatus may not update the positioning accuracy information for the at least one future position of the terminal.

In step 714 sends an indication to the terminal indicating the available positioning accuracy information associated with the at least one future position of the terminal.

Figure 8:
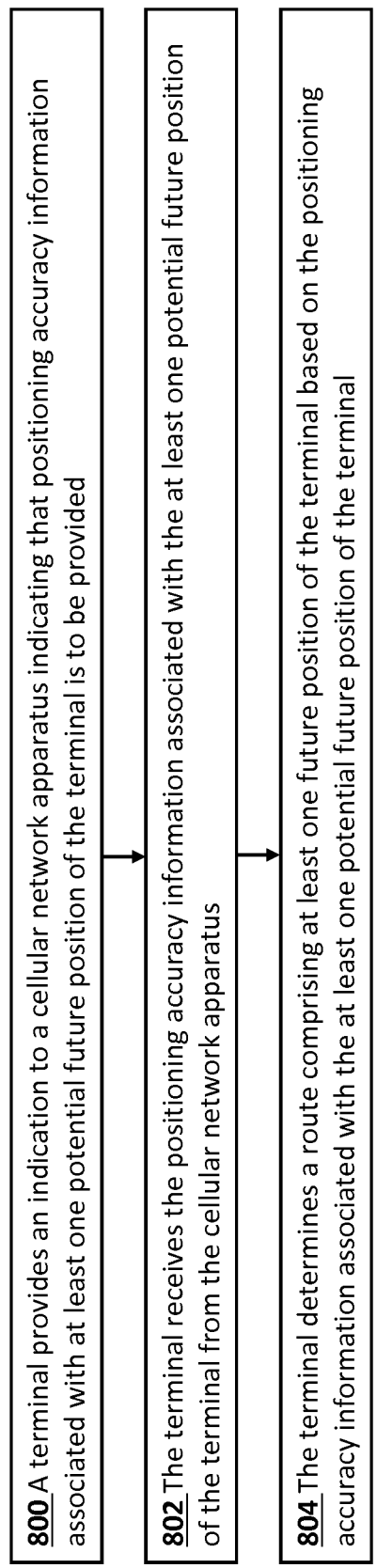
FIG. 8 shows a schematic representative of a method of providing positioning accuracy information associated with at least one potential future position of a terminal performed by a terminal such as an automatic guided vehicle.

FIG. 8 shows a schematic representative of a method of providing positioning accuracy information associated with at least one potential future position of a terminal performed by a terminal (e.g. AGV).

In step 800 the terminal may provide an indication indicating that positioning accuracy information associated with at least one potential future position of a terminal is to be provided. The indication may be provided to a cellular network apparatus.

In an implementation, the terminal may subscribe to a service to be provided with location assistance data. The location assistance data may comprise positioning accuracy information associated with at least one potential future position of the terminal, positioning availability information associated with the at least one potential future position of the terminal and/or positioning method information associated with the at least one potential future position of the terminal.

In another implementation, the terminal may subscribe to a service to be provided with the positioning accuracy information of the at least one potential future position of the terminal.

In yet another implementation, the terminal may send a request to be provided with the positioning accuracy information associated with the at least one potential future position of the terminal.

In step 802 the terminal may receive the positioning accuracy information associated with the at least one potential future position of the terminal. The positioning accuracy information may be received from the cellular network apparatus.

In step 804 the terminal may determine a route comprising at least one future position of the terminal based on the positioning accuracy information associated with the at least one potential future position of the terminal.

It will be understood that if the positioning accuracy information associated with the at least one potential future position of the terminal is satisfactory (e.g. greater than a threshold) the route may comprise at least one future position which correspond to as the at least one potential future position of the terminal.

Otherwise, if the positioning accuracy information associated with the at least one potential future position of the terminal is not satisfactory (e.g. lower than a threshold) the route may comprise at least one future position which do not correspond to the at least one potential future position of the terminal.

Figure 9:
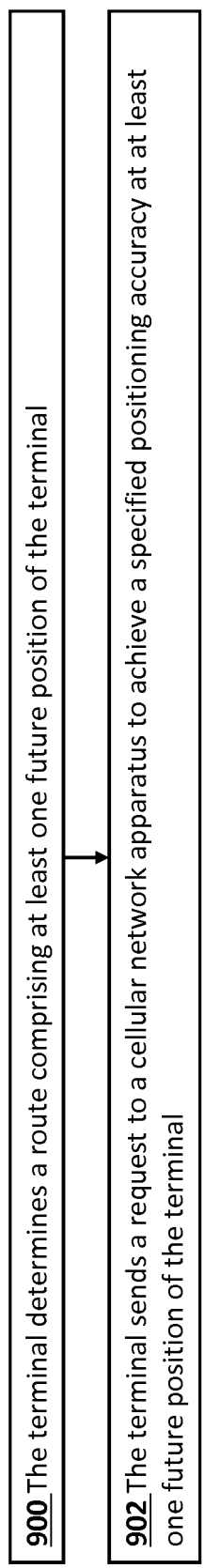
FIG. 9 shows a schematic representative of a method of sending a request for achieving a specified positioning accuracy at at least one future position of a terminal performed by a terminal such as an automatic guided vehicle.

FIG. 9 shows a schematic representative of a method of sending a request for achieving a specified positioning accuracy at at least one future position of a terminal performed by a terminal such as an automatic guided vehicle.

In step 900 the terminal may determine a route comprising at least one future position of the terminal. The terminal may send the at least one potential future position of the terminal to a cellular network apparatus.

Additionally or alternatively, the terminal may send a current position of the terminal and a target destination to the cellular network apparatus to allow the cellular network apparatus to determine a route comprising at least one potential future position of the terminal.

In step 902 the terminal may send a request to achieve a specified positioning accuracy at at least one future position of the terminal. The request may be sent to the cellular network apparatus. The specified positioning accuracy information may be specified by the terminal.

In an implementation, the terminal may send request from a terminal to set the positioning accuracy information associated with a future position of a terminal to given positioning accuracy information to be above a threshold during a current time interval and/or during a future time interval.

Figure 10:
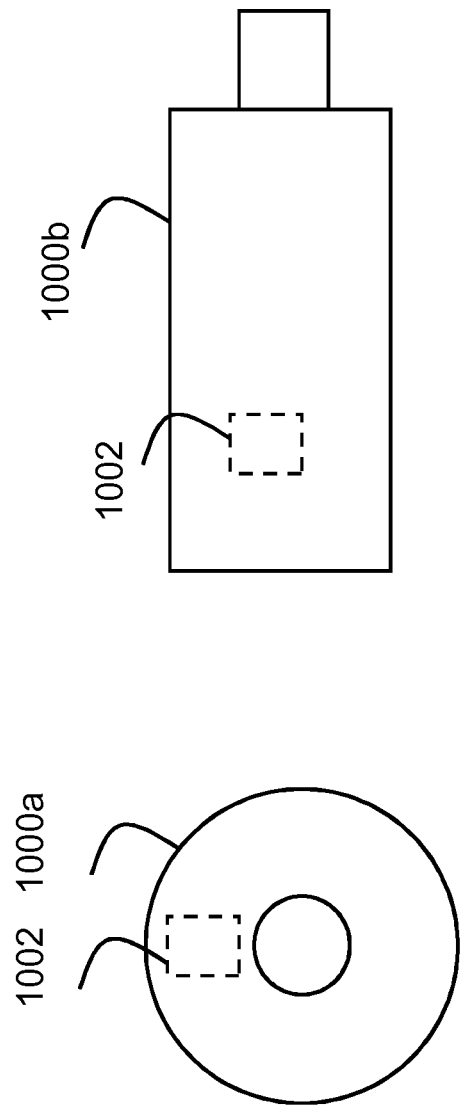
FIG. 10 shows a schematic representation of a non-volatile memory medium storing instructions which when executed by a processor allow a processor to perform one or more of the steps of the method of any of FIGS. 6 to 9.

FIG. 10 shows a schematic representation of non-volatile memory media 1000a (e.g. computer disc (CD) or digital versatile disc (DVD)) and 1000b (e.g. universal serial bus (USB) memory stick) storing instructions and/or parameters 1002 which when executed by a processor allow the processor to perform one or more of the steps of the methods of FIGS. 6 to 9.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 6 to 9, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An autonomously guided vehicle comprising:
 at least one processor; and
 at least one memory including computer program code;
 the at least one memory and the computer program code configured to, with the at least one processor, cause the autonomously guided vehicle at least to:
  provide an indication indicating that positioning accuracy information associated with at least one potential future position of the autonomously guided vehicle is to be provided, wherein the at least one potential future position comprises a position not yet occupied by the autonomously guided vehicle;

based on providing the indication, receive the positioning accuracy information associated with the at least one potential future position of the autonomously guided vehicle; and determine a route to a target destination based on the received accuracy information associated with the at least one potential future position of the autonomously guided vehicle, wherein the determining comprises:

if the positioning accuracy information associated with the at least one potential future position of the autonomously guided vehicle indicates positioning accuracy greater than a threshold, the route is determined to comprise the at least one potential future position of the autonomously guided vehicle; or if the positioning accuracy information associated with the at least one potential future position of the autonomously guided vehicle indicates positioning accuracy lower than the threshold, the route is determined to comprise at least one future position which does not correspond to the at least one potential future position associated with the positioning accuracy information; and utilizing the determined route for guidance of the autonomously guided vehicle to the target destination.

2. The autonomously guided vehicle of claim 1, wherein providing an indication indicating that positioning accuracy information associated with at least one potential future position of the autonomously guided vehicle is to be provided comprises:

subscribing to a service to be provided with location assistance data, wherein the location assistance data comprises:

positioning accuracy information associated with the at least one potential future position of the autonomously guided vehicle.

3. The autonomously guided vehicle of claim 2, wherein the location assistance data further comprises:

positioning availability information associated with the at least one potential future position of the autonomously guided vehicle; and/or positioning method information associated with the at least one potential future position of the autonomously guided vehicle.

4. The autonomously guided vehicle of claim 1, wherein providing the indication indicating that positioning accuracy information associated with at least one potential future position of the autonomously guided vehicle is to be provided comprises:

subscribing to a service to be provided with the positioning accuracy information of the at least one potential future position of the autonomously guided vehicle.

5. The autonomously guided vehicle of claim 1, wherein providing the indication indicating that positioning accuracy information associated with at least one potential future position of the autonomously guided vehicle is to be provided comprises:

sending a request to be provided with the positioning accuracy information associated with the at least one potential future position of the autonomously guided vehicle.

6. The autonomously guided vehicle of claim 1, wherein the at least one memory and the computer program code are configured to, with the at least one processor, cause the autonomously guided vehicle at least to:

determine and send the at least one potential future position of the autonomously guided vehicle.

* * * * *